United States Patent
Jaeckle et al.

[11] Patent Number: 6,161,895
[45] Date of Patent: Dec. 19, 2000

[54] PLEATED CORNERS FOR VEHICLE TRIM OPENINGS

[75] Inventors: Kurt Jaeckle, St. Clair Shores, Mich.; William Blackbird, Seatec, Wash.; Kirk E. Gilewski, Algonac, Mich.

[73] Assignee: Lear Automotive Dearborn, Inc., Southfield, Mich.

[21] Appl. No.: 09/032,553

[22] Filed: Feb. 27, 1998

[51] Int. Cl.[7] .................................................. B60J 13/02
[52] U.S. Cl. .......................................................... 296/214
[58] Field of Search .................................. 296/214, 39.1, 296/146.7; 428/181

[56] References Cited

U.S. PATENT DOCUMENTS

| | | | |
|---|---|---|---|
| 4,600,621 | 7/1986 | Maurer et al. | 428/121 |
| 4,718,714 | 1/1988 | Tanino et al. | 296/214 |
| 5,108,147 | 4/1992 | Grimm et al. | 296/214 |
| 5,275,865 | 1/1994 | Nicolay | 428/174 |
| 5,494,737 | 2/1996 | Sakai et al. | 428/317.9 |
| 5,823,611 | 10/1998 | Daniel et al. | 296/214 |
| 5,833,304 | 11/1998 | Daniel et al. | 296/214 |

*Primary Examiner*—D. Glenn Dayoan
*Assistant Examiner*—Patricia Engle
*Attorney, Agent, or Firm*—MacMillan, Sobanski & Todd, LLC

[57] ABSTRACT

A unique method of forming a headliner around a sunroof opening includes providing pleats at a corner of a portion of said headliner which is to be deformed behind a rear surface of said headliner. The pleats facilitate the bending of the material and provide a smooth appearance at the interior. Methods are disclosed for forming this pleated structure behind the headliner.

11 Claims, 8 Drawing Sheets

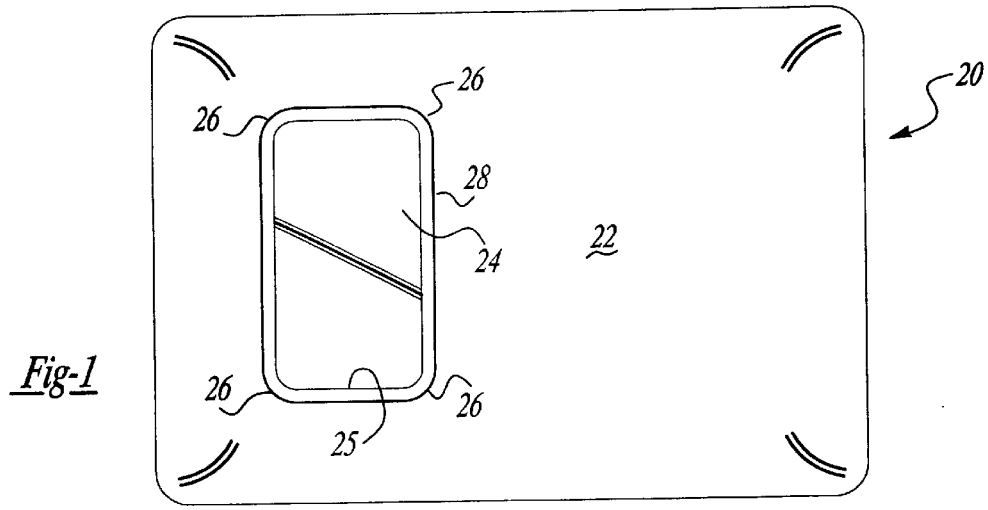
Fig-1
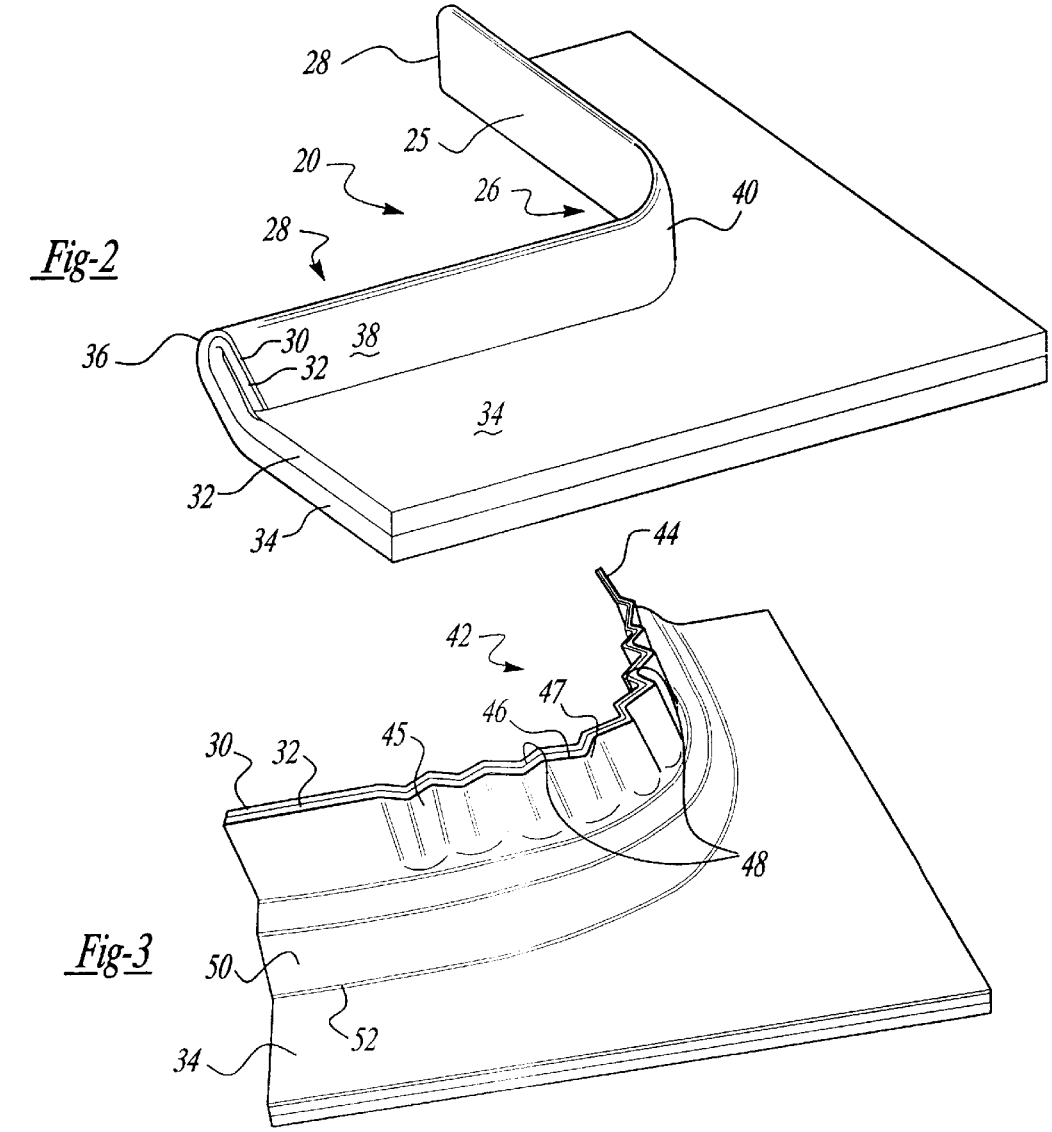
Fig-2
Fig-3

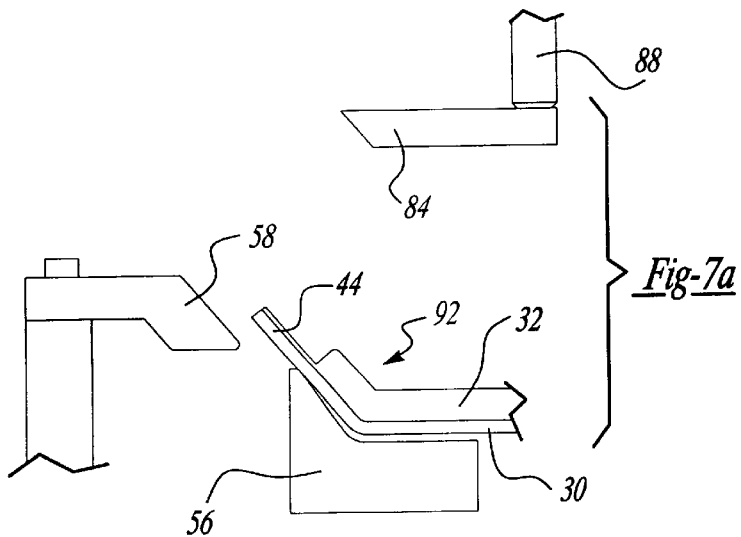
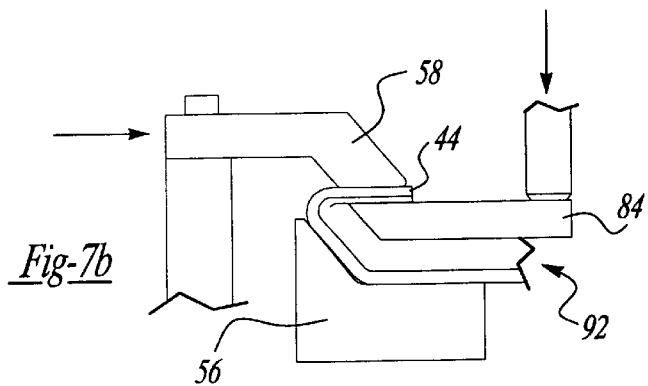
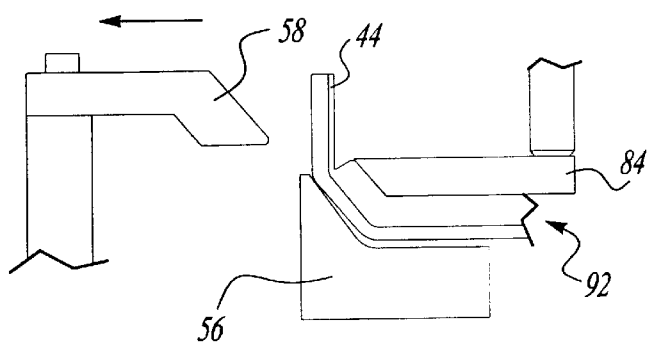
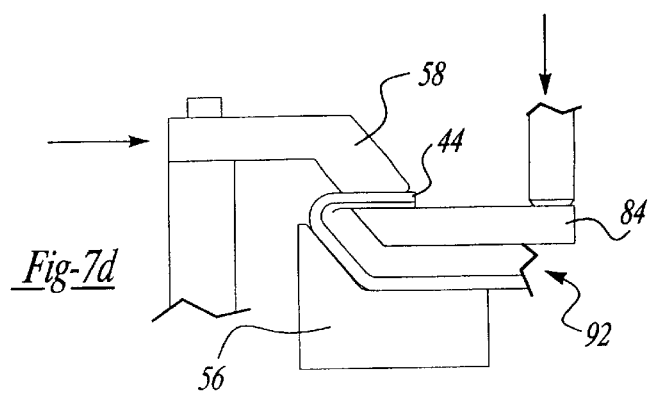

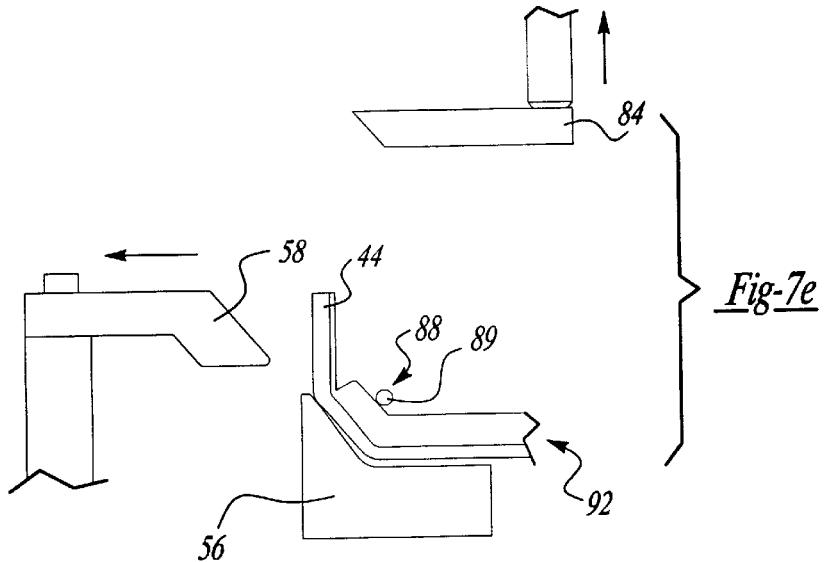
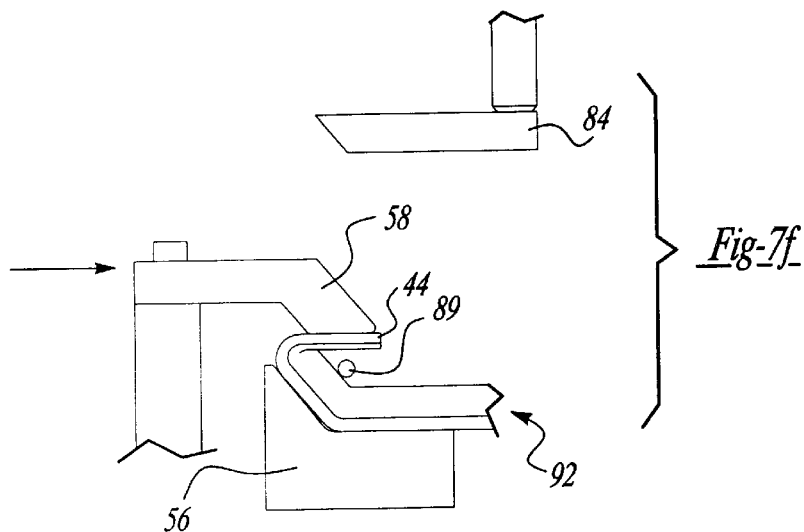
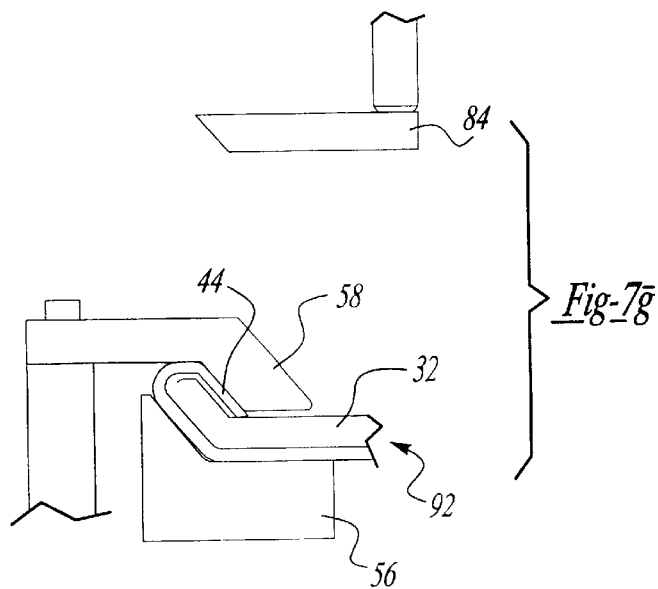

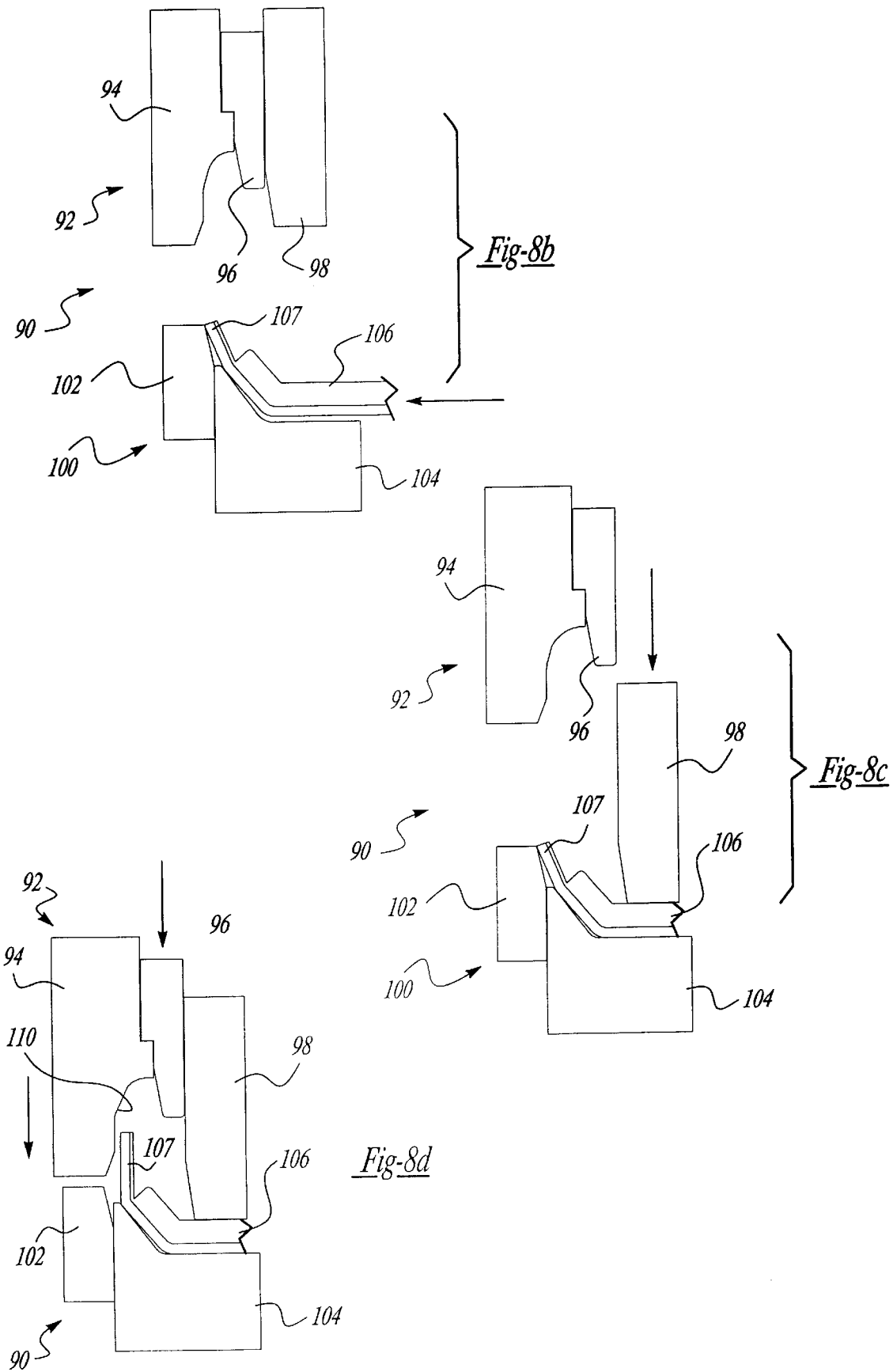

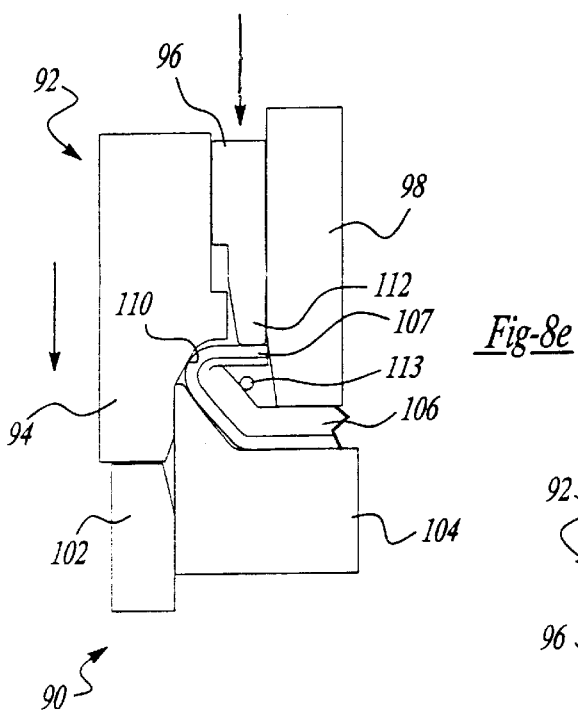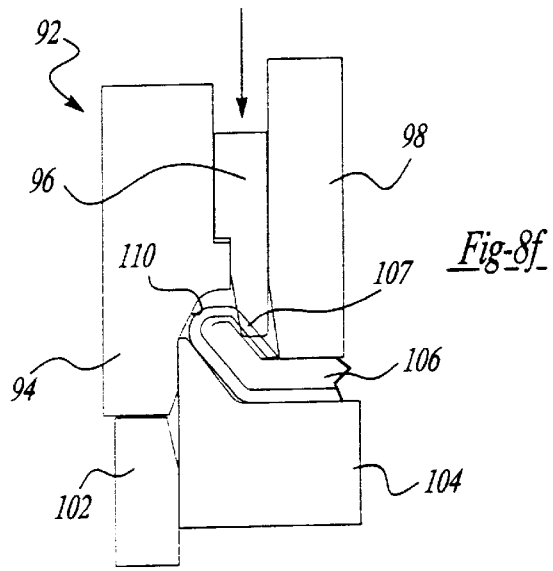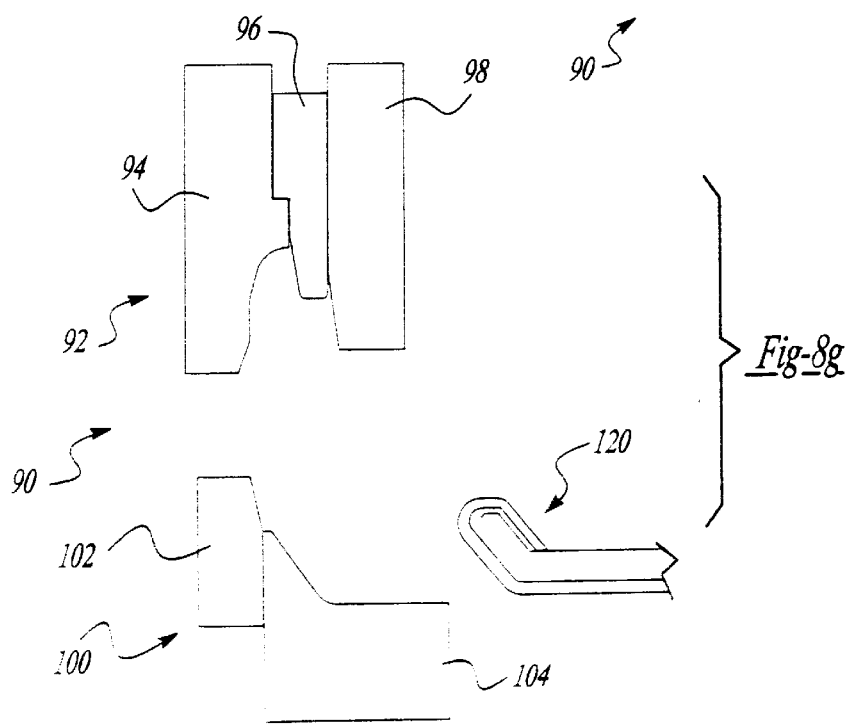

12 6,161,895

PLEATED CORNERS FOR VEHICLE TRIM OPENINGS

BACKGROUND OF THE INVENTION

This Application relates to a unique method of forming a vehicle trim panel such that an opening through the panel has an attractive appearance.

In the prior art, vehicle trim panels are the subject of much design effort. In particular, headliners are one type of vehicle trim panel that must overcome several competing design interests. On the one hand, the headliner must be inexpensive, and thus not require too many complex material layers. On the other hand, the headliner is intended to muffle sound, and support itself over the lifetime of the vehicle while still providing a pleasant appearance.

Typically, headliners include at least a thin fabric decorative layer and a foam core. Other layers are usually also included.

One problem with headliners is providing an acceptable appearance around an opening, such as an opening to receive a sunroof. While the present invention is disclosed for forming the headliner around a sunroof opening, it should be understood that other openings would also benefit from this invention. A sunroof opening typically has four sides, with curved corners connecting the sides. Historically, a secondary seal or molding has been placed within the opening to provide an acceptable appearance around the opening. Without the molding, the headliners in the prior art have had an unacceptable appearance around the opening.

One other type of prior art structure has utilized a headliner construction wherein the thin decorative layer extends beyond the foam layer at the opening. The decorative layer has been wrapped behind the foam layer around the opening. This method has some undesirable characteristics.

SUMMARY OF THE INVENTION

In a disclosed embodiment of this invention, a headliner substrate includes a foam core, and a decorative layer. The layers have an edge portion around an opening, which extends beyond the surface which is to be seen when the headliner is assembled in the vehicle. The edge portion is formed around the entire circumference of the opening. In the present invention, corners of the edge portion are formed with a pleated configuration. When these portions are bent back, the pleats accommodate the bending by provided additional material to allow the edge portion to be positioned above the opening. After bending, the edge portion must cover a greater area than it does initially, and thus the provision of the extra surface area by the pleats provides benefits. The pleats allow the edge fold to have a smooth configuration at the interior surface.

In a preferred embodiment of this invention, the pleats may be formed with cuts to facilitate bending. In a most preferred embodiment, the pleats extend for a length which is approximately 1.59 times as long as the surface along which the outermost end of the pleats will be aligned.

In other features of this invention, a method and apparatus for forming the headliner includes a plurality of slides which move to bend the edge portion behind the opening. Two distinct machine embodiments are disclosed.

These and other features of the present invention will be best understood from the following specification and drawings, the following of which is a brief description.

BRIEF DESCRIPTION OF THE DRAWINGS

FIG. 1 shows a headliner according to the present invention.

FIG. 2 is a top view of the headliner, with an edge portion wrapped around an opening.

FIG. 3 is a view similar to FIG. 2, but showing an intermediate stage in the formation of the headliner.

FIG. 7A shows a first step in the method of forming the present invention with the FIG. 5 embodiment machine.

FIG. 7B shows a subsequent step.

FIG. 7C shows a subsequent step.

FIG. 7D shows a subsequent step.

FIG. 7E shows a subsequent step.

FIG. 7F shows a subsequent step.

FIG. 7G shows a subsequent step.

FIG. 8B shows a subsequent step to that shown in FIG. 8A.

FIG. 8C shows a subsequent step.

FIG. 8D shows a subsequent step.

FIG. 8E shows a subsequent step.

FIG. 8F shows a subsequent step.

FIG. 8G shows a subsequent step.

DETAILED DESCRIPTION OF THE PREFERRED EMBODIMENT

Figure 4:
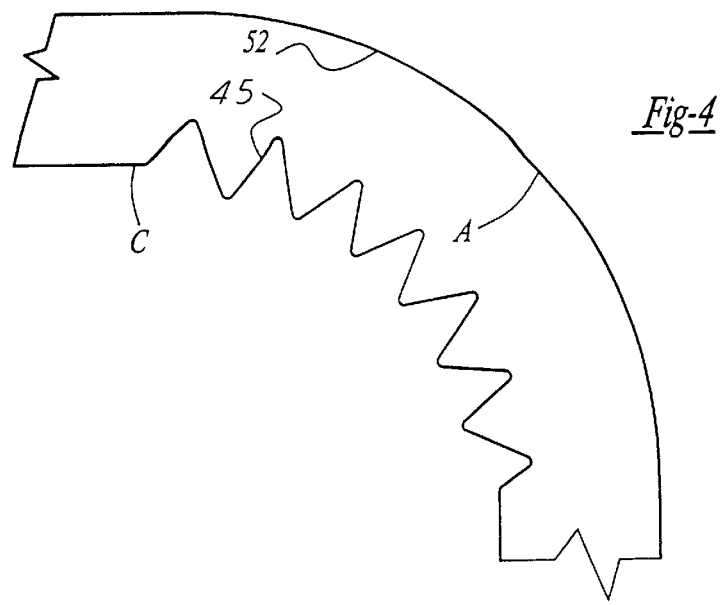
FIG. 4 shows dimensional aspects of this invention.

FIG. 1 shows a headliner 20 incorporating an outer surface 22 which will be visible to an occupant of the vehicle. A sunroof 24 is received within an opening 25 in the headliner. Opening 25 includes corners 26, which are curved, and straight portions 28. As described above, the prior art has faced challenges in forming the headliner, and in particular at the curved portions.

FIG. 2 shows the headliner 20, from the opposed side from that shown in FIG. 1. Corners 26 and straight portions 28 surround opening 25. The headliner can be seen to include an outer decorative layer 30, which is preferably a foamed-back fabric, and a foam substrate 32. The foam substrate 32 is preferably a urethane-based foam, while the decorative layer 30 preferably includes a nylon fabric-based foam backing. The specific materials are well known in the headliner arts.

The headliner material is bent around the opening 25 such as shown in 36 to the portion 38 which overlies a portion of the headliner. As also shown, the edge portion includes corner portions 40 to cover corners 26 of the opening.

FIG. 3 shows a headliner preform 42. Edge portion 44 extends beyond the nominal portion of the headliner material. A pleated portion 45 includes pleats 46 and 47. Cuts 48 may be formed at the innermost extent of at least some pleats. The cuts facilitate expansion of the pleated portions. The pleats facilitate bending to the position shown in FIG. 2. To form the preform 42, the headliner layers 30 and 32 are initially formed together. The pleated configuration is formed into the headliner layers. The layers are waterjet cut to include the opening 25. The pleats are formed by molding before or after waterjet cutting.

A ramped portion 50 of foam layer 32 is formed beyond edge portion 44. An outer extent 52 of the ramp portion 50 is shown.

As shown in FIG. 4, the pleated portion 45 preferably has a length which is greater than the length 52, along which the pleated portion will lie. Generally, the length through the pleated position should be greater than the length along which it lies. More preferably the ratio of the two lengths should be at least 1.5:1.0. In a most preferred embodiment, ratio of the length of pleated portion 45, including all pleats, to the length (A) at position 52 through the area along which portion 45 will lie (FIG. 2) is 1.59:1.00. Also, the following formula should be true:

$$C/A \geq C$$

This is shown in FIG. 4.

Figure 5:
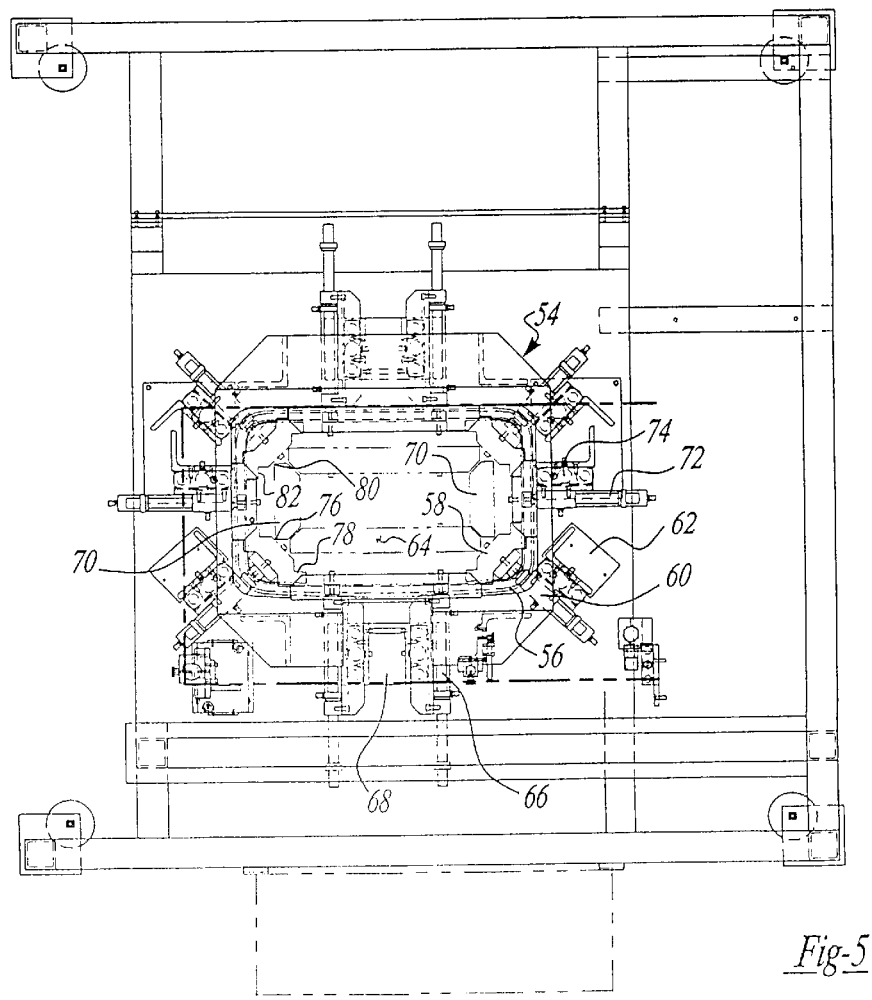
FIG. 5 shows a first embodiment machine for forming the present invention.

FIG. 5 shows a machine 54 for forming the inventive headliner. As shown, a nest 56 receives the preform 42, as will be explained below. A corner slide portion 58 moves to bend edge portion 44 around opening 25. A first piston 60 pulls machine corner slide portion 58 outwardly, and a second piston 62 moves piston 68 and corner slide portion 58 vertically. A side straight machine slide portion 64 is provided with pistons 66 and 68 to provide both lateral and vertical movement, as described with regard to corner portion 58. An end slide portion 70 is provided with piston 72 and 74 to provide its movement. As shown, the corners 76 of the slide portion 64 are aligned with a notch 78 in the corner slide portion 58. The corner slide portion 58 is initially moved to move outwardly of the end of the slide portion 64. The slide portion 64 may then move laterally outwardly. Similarly, an end portion 80 of the portion 70 is aligned with a notch 82 in the corner portions.

Figure 6:
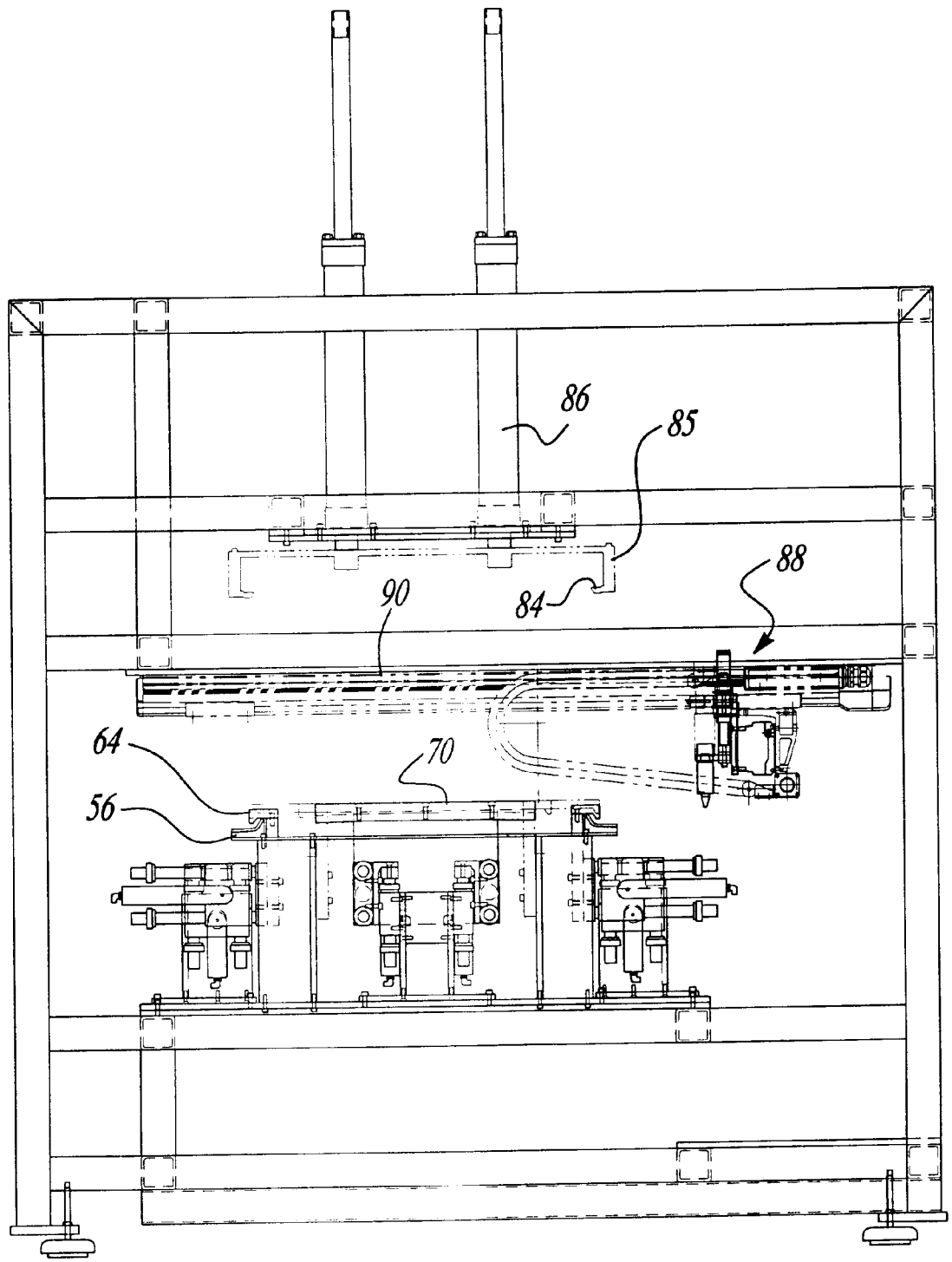
FIG. 6 is a view generally perpendicular to FIG. 5.

As shown in FIG. 6, a break ring 84 includes a portion 85 extending upwardly and mounted to pistons 86. The break ring 84 may then move downwardly, to provide a support for bending of the headliner preform. As shown in FIG. 6, a glue dispensing mechanism 88 is movable on a guide 90 such that it can surround the opening 25 and deposit glue, as will be explained below.

FIGS. 7A–7H will provide a simplified view of the formation of the headliner according to the first machine embodiment.

As shown, the nest 56 receives the preform 42. Preform 42 is formed with edge portion 44, which includes the pleats at the corner, and which is folded behind the headliner. Although portion 44 is shown in FIGS. 7 and 8, it should be understood that some folding occurs around the entire periphery of opening 25. A slide portion, (e.g., corner slide portion 58), is initially position spaced from the edge portion 44. At the same time, the break ring 84 is positioned away from the preform 42.

As shown in FIG. 7B, the first step is to bring the break ring 84 into contact with the preform 42. At that time, the slides are moved radially across the opening such that they break portion 44. The foam in preform 42 cracks when moved to the FIG. 7B position. When considering this movement in conjunction with FIG. 5, it should be understood that the corners 58 first move such that they are out of the way of the straight portions 64 and 70, which then move.

As shown in FIG. 7C, the slides are then moved away from the preform 42, and edge portion 44 then springs back. FIG. 7D shows a repeated breaking step wherein the slide is again brought against edge portion 44 to bend and crack the foam against break ring 84. This step may be repeated for additional cycles. In a preferred embodiment, three brake movements are utilized.

FIG. 7E shows the break ring 84 and the slides moved away from the preform 42. Edge portion 44 again springs back to its original position. A glue dispensing portion 88 then dispenses glue as shown schematically at 89 onto the preform 42.

FIG. 7F shows a subsequent step. The break ring 84 is moved back vertically upwardly, and the slides, are moved back inwardly to deform edge portion 44 back behind layer 32.

As shown in FIG. 7G, the slides are then brought vertically downwardly to bend edge portion 44 back onto the glue 89, and secure edge portion 44 to the rear of the layer 32.

Figure 7H:
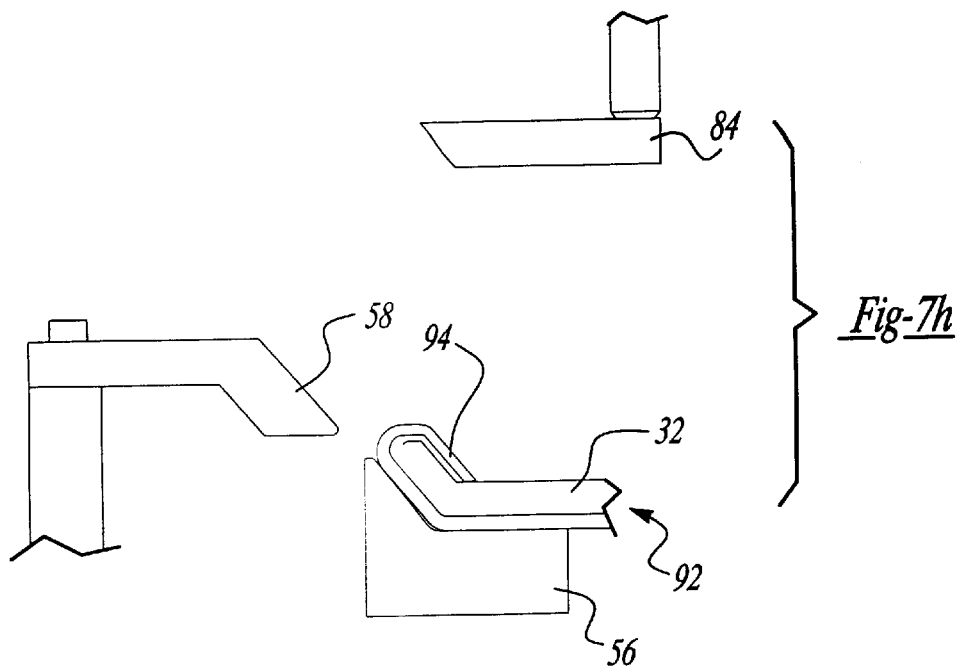
FIG. 7H shows a subsequent step.
Figure 8A:
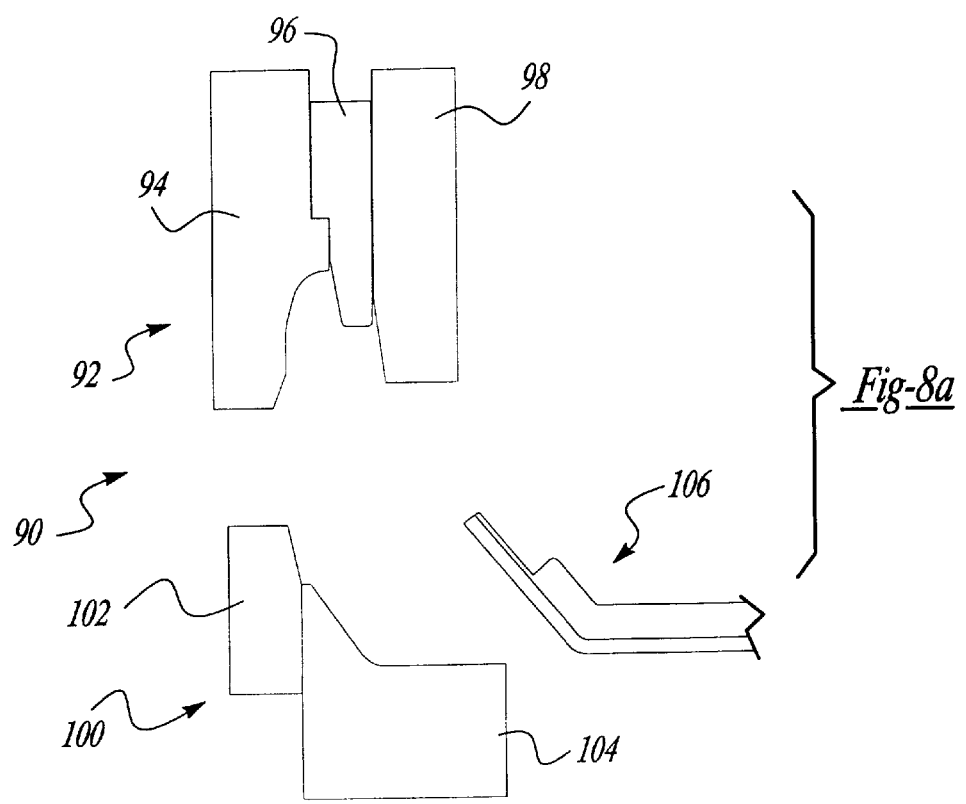
FIG. 8A shows a second embodiment method.

As shown in FIG. 7H, the slides may then be removed, and the finished headliner may then be moved off of the machine.

FIGS. 8A–8G show a second embodiment method 90.

In embodiment 90, an upper die 92 has an inner upper die 94, an upper central die 96 and an upper outer die 94. The lower die 100 has a lower inner die 102 and a lower outer die 104. All of the dies are movable upwardly and downwardly as shown in this figure. A headliner preform 106 is initially placed into the lower outer die 104. As shown in FIG. 8B, the lower inner die 102 supports the outer surface of edge portion 107 of the preform 106 which is to be deformed behind the preform 106.

As shown in FIG. 8C, an initial step is to bring the upper outer die 98 downwardly to clamp the preform 106.

As shown in FIG. 8D, the next step is to bring the upper inner die downwardly such that a curved surface 110 is approximately positioned near edge portion 107 of the preform 106. At the same time, the lower inner die 102 is lowered away from the upper inner die 94.

As shown in FIG. 8E, a subsequent step is to bring the upper inner die 94 further downwardly such that surface 110 deforms portion 107. Upper central die 96 is then brought further downwardly, with portion 112 moving beyond portion 110 to further deform the portion 107. A previously deposited adhesive 113 may be positioned on substrate 106 as in the prior embodiment.

As shown in FIG. 8F, upon further movement of the upper central die 96, edge portion 107 is forced against the rear of the substrate 106.

As shown in FIG. 8G, all of the dies may then be removed and headliner 120 removed from the system.

With regard to the design of the pleats, several features should be mentioned. Although two outer cuts are shown, a single central cut may be used, or the cuts could be positioned at several of the pleats, or at strategic locations aligned along the pleats. The length and shape of the pleats can be designed according to the particular application. The pleats may vary as the size and contours of corners change the most preferable shape of the pleats will change. A "Geisha"-type pleat may be preferred. In addition, the outermost pleats at each side of portions 44 may be circumferentially smaller then the other pleats.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A vehicle headliner comprising:
    a headliner body being generally planar and comprising at least two layers, with at least a portion of one of said layers including foam material;

said headliner including an opening extending through said layers, an opening periphery being defined around said opening, and said layers, including said foam layer, having an edge portion bent back from a forward surface of said headliner, back onto a rear surface around said opening, wherein said periphery includes corners and straight portions, and there being pleats in said edge portion of said headliner which is bent behind said rear surface around said corners.

2. A headliner as recited in claim 1, wherein said pleats include at least one pleat which is formed with a cut to facilitate expansion of said pleat when it is bent onto said rear surface of said headliner.

3. A headliner as recited in claim 1, wherein said pleated portion of said opening is designed to have a ratio that is greater than 1.5:1.0 relative to a portion of said rear face of said headliner along which said portion is secured.

4. A headliner as recited in claim 1, wherein said opening accommodates a sunroof.

5. A vehicle headliner comprising:

a headliner body being generally planar and comprising at least two layers, with at least a portion of one of said layers including foam material;

said headliner including an opening extending through said layers, an opening periphery being defined around said opening, an edge portion, including said foam layer, being bent back from a decorative surface of said headliner, back onto a rear surface of said headliner around said opening;

said opening having four straight positions and four curved corners, pleats being formed in said edge position at said corners, prior to said edge position being bent back, and said straight portion not including any pleats, and said opening receiving a sunroof, wherein at least one of said pleats is cut prior to being bent.

6. A vehicle headliner comprising:

a headliner body being generally planar and comprising at least two layers, with at least a portion of one of said layers including foam material;

said headliner including an opening extending through said layers, an opening periphery being defined around said opening, and said layers, including said foam layer, having an edge portion bent back from a forward surface of said headliner, back onto a rear surface around said opening, said periphery including corners and straight portions, and there being pleats in said edge portion of said headliner which is bent behind said rear surface around said corners, wherein said pleats include at least one pleat which is formed with a cut to facilitate expansion of said pleat when it is bent onto said rear surface of said headliner.

7. A headliner as recited in claim 6, wherein said pleated portion of said opening is designed to have a ratio that is greater than 1.5:1.0 relative to a portion of said rear face of said headliner along which said portion is secured.

8. A headliner as recited in claim 6, wherein said opening accommodates a sunroof.

9. A vehicle headliner comprising:

a headliner body being generally planar and comprising at least two layers, with at least a portion of one of said layers including foam material;

said headliner including an opening extending through said layers, an opening periphery being defined around said opening, and said layers, including said foam layer, having an edge portion bent back from a forward surface of said headliner, back onto a rear surface around said opening, said periphery including corners and straight portions, and there being pleats in said edge portion of said headliner which is bent behind said rear surface around said corners, wherein said pleated portion of said opening is designed to have a ratio that is greater than 1.5:1.0 relative to a portion of said rear face of said headliner along which said portion is secured.

10. A headliner as recited in claim 9, wherein said pleats include at least one pleat which is formed with a cut to facilitate expansion of said pleat when it is bent onto said rear surface of said headliner.

11. A headliner as recited in claim 9, wherein said opening accommodates a sunroof.

* * * * *